United States Patent
van Riel et al.

(10) Patent No.: US 10,209,917 B2
(45) Date of Patent: Feb. 19, 2019

(54) PHYSICAL MEMORY MIGRATION FOR SECURE ENCRYPTED VIRTUAL MACHINES

(71) Applicant: Red Hat, Inc., Raleigh, NC (US)

(72) Inventors: Henri Han van Riel, Merrimack, NH (US); Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/492,100

(22) Filed: Apr. 20, 2017

(65) Prior Publication Data

US 2018/0307435 A1 Oct. 25, 2018

(51) Int. Cl.
*G06F 3/06* (2006.01)
*G06F 9/455* (2018.01)

(52) U.S. Cl.
CPC .......... *G06F 3/0647* (2013.01); *G06F 3/0623* (2013.01); *G06F 3/0673* (2013.01); *G06F 9/45558* (2013.01); *G06F 2009/4557* (2013.01); *G06F 2009/45583* (2013.01)

(58) Field of Classification Search
CPC ... G06F 3/0673; G06F 3/0623; G06F 9/45558
USPC ........................ 711/170, 154, 165
See application file for complete search history.

(56) References Cited

U.S. PATENT DOCUMENTS

| | | | |
|---|---|---|---|
| 8,627,112 B2 | 1/2014 | Chaturvedi et al. | |
| 8,776,059 B2 * | 7/2014 | Reumann | H04L 63/0263 709/250 |
| 9,361,145 B1 | 6/2016 | Wilson et al. | |
| 9,563,569 B2 | 2/2017 | Tsirkin | |
| 2012/0030406 A1 * | 2/2012 | Chang | G06F 9/5016 711/6 |
| 2012/0324239 A1 | 12/2012 | Falk et al. | |
| 2013/0097296 A1 | 4/2013 | Gehrmann et al. | |
| 2015/0046927 A1 * | 2/2015 | Rodbro | G06F 9/50 718/104 |
| 2015/0100791 A1 * | 4/2015 | Chen | G06F 12/1408 713/189 |
| 2015/0193248 A1 * | 7/2015 | Noel | G06F 9/45558 718/1 |
| 2015/0381589 A1 | 12/2015 | Tarasuk-Levin et al. | |

(Continued)

OTHER PUBLICATIONS

Divyambika, et al., "Protection of Virtual Machines during Live Migration in Cloud Environment", School of Computing, SASTRA University, Thanjavur—613401, Tamil Nadu, India, May 2015, http://www.indjst.org/index.php/indjst/article/viewFile/65589/55379, 7 pages.

(Continued)

*Primary Examiner* — Pierre Miche Bataille
(74) *Attorney, Agent, or Firm* — Lowenstein Sandler LLP (57) ABSTRACT

Systems and methods for migrating encrypted storage blocks in a security enhanced manner. An example method may comprise: selecting, by the hypervisor, a first storage block and a second storage block, the first storage block being associated with a virtual machine; associating the second storage block with the virtual machine; providing, by the hypervisor, an instruction for the virtual machine to copy content of the first storage block to the second storage block; and enabling the virtual machine to access the content in the second storage block.

20 Claims, 6 Drawing Sheets

(56) References Cited

U.S. PATENT DOCUMENTS

| | | | |
|---|---|---|---|
| 2016/0026489 A1* | 1/2016 | Maislos | G06F 9/45558 |
| | | | 718/1 |
| 2016/0034296 A1* | 2/2016 | Kedem | G06F 9/45558 |
| | | | 718/1 |
| 2016/0266923 A1* | 9/2016 | Miyoshi | G06F 9/45558 |
| 2017/0003882 A1 | 1/2017 | Bartik et al. | |
| 2017/0177441 A1* | 6/2017 | Chow | G06F 11/1407 |
| 2017/0262204 A1* | 9/2017 | Dornemann | G06F 9/45558 |
| 2018/0089468 A1* | 3/2018 | Rozas | G06F 21/78 |

OTHER PUBLICATIONS

Aiash, et al., "Secure Live Virtual Machines Migration: Issues and Solutions", School of Science and Technology Middlesex University, UK, May 2014, https://www.researchgate.netpublication/260763074_Secure_Live_Virtual_Machines_Migration_Issues_and_Solutions, 10 pages.

Steele, "Virtual Machine Migration FAQ: Live Migration, P2V and More", Aug. 2010, http://searchservervirtualization.techtarget.com/feature/Virtual-machine-migration-FAQ-Live-migration-P2V-and-more, 4 pages.

* cited by examiner

PHYSICAL MEMORY MIGRATION FOR SECURE ENCRYPTED VIRTUAL MACHINES

TECHNICAL FIELD

The present disclosure is generally related to data storage management, and more particularly, to moving and organizing encrypted data.

BACKGROUND

Modern computer systems often encrypt data within data storage devices to protect a computer system against a variety of attacks. Although data is typically encrypted when it is stored on a hard disk, it often remains unencrypted within main memory. This may leave the data vulnerable to snooping by an unauthorized administrator or unauthorized executable code. Non-volatile memory technology has increased the vulnerability because the non-volatile memory may be physically removed from a system with the data intact, similar to a hard drive. Modern systems have attempted to reduce this vulnerability by using memory devices that provide encryption. The encryption may be performed at the hardware level and may conceal underlying data from executable code that is tasked with managing the data.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Modern computer systems use cryptographic functions to encrypt data stored within a data storage device. The cryptographic functions often use variations in cryptographic input to enhance security and cause multiple instances of identical content to appear different once encrypted. Some cryptographic systems provide this variation by performing the encryption at a hardware level using a cryptographic key that is based on hardware embedded information of the data storage device (e.g., physical storage address). In a virtualized computer system, the hardware level encryption may encrypt storage of a virtual machine so that it is accessible by the virtual machine but inaccessible by the hypervisor or host operating system that supports the virtual machine. This may enhance security but may cause the storage of a virtual machine to become inaccessible when moved by the hypervisor. This may be problematic because the hypervisor may be responsible for moving and organizing the data of one or more virtual machines to optimize access to the data. In the past, the hypervisor may be provided with the ability to decrypt the data so that the hypervisor could move the data within the data storage device, but this may present a security vulnerability.

Aspects of the present disclosure address the above and other deficiencies by providing technology that enables storage management features of a hypervisor to migrate a storage block of a virtual machine that is encrypted with location dependent encryption without accessing the data in an unencrypted form. The hypervisor may perform the data migration by associating a new storage block with the virtual machine and causing the virtual machine to move the content of the storage block to the new storage block. The virtual machine may have access to the content of the storage block and may therefore move the storage block to the new storage block without making the content inaccessible. In one example, the new storage block may be a storage block that was not previously associated with the virtual machine and the hypervisor may associate the new storage block with the virtual machine so that the virtual machine can migrate the content of the data storage to the new storage block.

The systems and methods described herein include technology that enables data movement in a security enhanced computing environment. In particular, aspects of the present disclosure may enable a hypervisor to move data that is encrypted with a location based encryption without making the data inaccessible or exposing the data in an unencrypted form to the hypervisor. In one example, this may enhance the performance and security of a computing system because the hypervisor may be able to organize the encrypted data within a data storage device to enhance access to the encrypted data. The organization of the data may involve defragmenting the encrypted data so that it is more contiguous or may involve realigning the data so that it is more easily accessed using existing or alternative storage access units (e.g., block, word, page). In another example, this may enhance the performance and security of a computing system because the hypervisor may be able to copy the encrypted data to another level of a cache hierarchy. For example, an encrypted storage block of a virtual machine may be moved from primary storage (e.g., main memory) to secondary storage (e.g., extended memory, hard drive, solid state storage).

Various aspects of the above referenced methods and systems are described in details herein below by way of examples, rather than by way of limitation. The examples provided below discuss a virtualized computer system where the data migration may be initiated by aspects of a hypervisor, a host operating system, a virtual machine, or a combination thereof. In other examples, the data migration may be performed in a non-virtualized computer system that is absent a hypervisor or other virtualization features discussed below.

Figure 1:
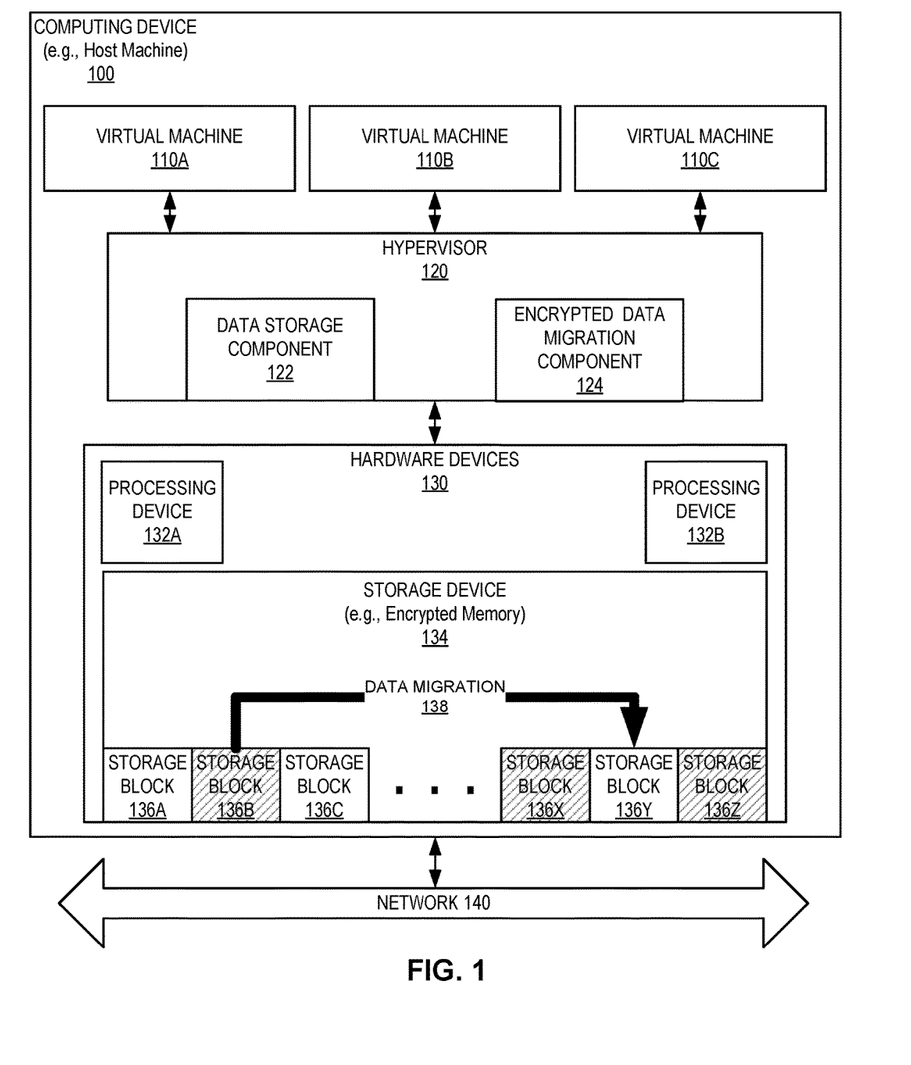
FIG. 1 depicts a high-level block diagram of an example computer system architecture that migrates encrypted data in a security enhanced manner, in accordance with one or more aspects of the present disclosure.

FIG. 1 depicts an illustrative architecture of elements of a computing device 100, in accordance with an embodiment of the present disclosure. It should be noted that other architectures for computing device 100 are possible, and that the implementation of a computing device utilizing embodiments of the disclosure are not necessarily limited to the specific architecture depicted.

Computing device 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computing device 100 may be a computing device implemented with x86 hardware. In another example, computing device 100 may be a computing device implemented with PowerPC®, SPARC®, or other hardware. In the example shown in FIG. 1, computing device 100 may include virtual machines 110A-C, hypervisor 120, hardware devices 130, and a network 140.

Virtual machines 110A-C may execute guest executable code that uses an underlying emulation of the physical resources. The guest executable code may include a guest operating system, guest applications, guest device drivers, etc. Each of the virtual machines 110A-C may support hardware emulation, full virtualization, para-virtualization, operating system-level virtualization, or a combination thereof. Virtual machines 110A-C may have the same or different types of guest operating systems, such as Microsoft®, Windows®, Linux®, Solaris®, etc.

Hypervisor 120 may also be known as a virtual machine monitor (VMM) and may provide virtual machines 110A-C with access to one or more features of the underlying hardware devices 130. In the example shown, hypervisor 120 may run directly on the hardware of computing device 100 (e.g., bare metal hypervisor). In other examples, hypervisor 120 may run on or within a host operating system (not shown). Hypervisor 120 may manage system resources, including access to hardware devices 130. In the example shown, hypervisor 120 may include a data storage component 122 and an encrypted data migration component 124. Components 122 and 124 may each be separated into one or more components or may be included within the same component.

Data storage component 122 may analyze storage device 134 to detect when one or more portions of storage device 134 may be reorganized to optimize access to data within the storage device. Data storage component 122 may analyze aspects of one or more storage blocks (e.g., ownership, time, location, size) and may select a storage block that may be migrated to enhance the performance of the storage device. Data storage component may enable computing device 100 to associate or disassociate storage blocks 136A-Z with one or more particular virtual machines 110A-C. A virtual machine may be associated with one or more storage blocks when the virtual machine is created (e.g., constructed), launched (e.g., initiated), during execution, or a combination thereof. During the virtual machine's operation, the data storage component 122 may associate one or more additional storage blocks with the virtual machine that were not previously associated with the virtual machine. Data storage component 122 may then indicate that the content of an existing storage block can be moved to the new storage block. Data storage component 122 may control access to the original and new storage block before, during, or after the move in order to avoid data being lost during the move.

Encrypted data migration component 124 may interact with data storage component 122 to perform a data migration 138 of one or more storage blocks (e.g., 136B) to one or more recently added storage blocks (e.g., 136Y). As discussed above, the content of the storage blocks may be encrypted with a location dependent cryptographic key and the virtual machine may have access to the content but the content may remain inaccessible to other virtual machines, a host operating system, or a hypervisor that is managing the storage blocks. If the hypervisor were to copy or move the encrypted content to a new location any subsequent attempt to decode the content using the location dependent cryptographic key at the new location would not successfully decrypt the content because the content was encrypted using a location dependent cryptographic key from the old location. To avoid the encrypted content from becoming inaccessible, encrypted data migration component 124 may provide instructions to have the virtual machine copy the content of the storage block to another storage block. This may be in the form of a hypervisor injecting or embedding a message within the virtual machine to cause the virtual machine to copy the content between locations within a data storage device.

Encrypted data migration component 124 may interact with one or more hardware devices 130 of the computing device 100 to initiate and manage the migration of a storage block. In one example, the migration of content between storage blocks may involve multiple separate location dependent cryptographic keys. There may be a location dependent cryptographic key for decrypting the content at a source location (e.g., original location) and a location dependent cryptographic key for encrypting the content and the target location (e.g., target location). In another example, the migration of content between storage blocks may involve the above location dependent cryptographic keys and also a location independent cryptographic key. The location independent cryptographic key may be a cryptographic key that is not based on a specific location of the storage block and may be used to encrypt the content after it is decrypted at the first location and before it is encrypted at the second location. In either example, the content of the storage block may remain inaccessible to the computing process (e.g., hypervisor) that is performing the migration of the encrypted content. The features of data storage component 122 and encrypted data migration component 124 are discussed in more detail below in regards to FIG. 2.

Hardware devices 130 may provide hardware resources and functionality for performing computing tasks. Hardware devices 130 may include one or more processing devices 132A-B and one or more storage devices 134. One or more of the hardware devices 130 may be split into multiple separate devices or consolidated into one or more hardware devices. For example, storage device 134 may include multiple different storage devices and some of the storage blocks (e.g., 136A-C) may be on a first storage device and some of the storage blocks (e.g., 136X-Z) may be on a second storage device. One or more of hardware device 130 may be absent from hardware devices 130 and may instead be partially or completely emulated by executable code.

Processing devices 132A and 132B may include one or more processors that are capable of executing the computing tasks discussed above in regards to components 122 and 124. Processing devices 132A and 132B may be a single core processor that is capable of executing one instruction at a time (e.g., single pipeline of instructions) or may be a multi-core processor that simultaneously executes multiple instructions. The instructions may encode arithmetic, logical, or I/O operations and may be used to execute a cryptographic function that performs encryption or decryption of data within storage device 134.

Storage device 134 may include volatile or non-volatile data storage. Volatile data storage (e.g., non-persistent storage) may store data for any duration of time but may lose the data after a loss of power or power cycle. Non-volatile data storage (e.g., persistent storage) may store data for any duration of time and may retain the data beyond a loss of power. In one example, storage device 134 may include one or more registers (e.g., processor registers) or memory devices (e.g., main memory). In another example, storage device 134 may include one or more mass storage devices, such as hard drives, solid-state storage (e.g., Solid State Drives (SSD)), other data storage devices, or a combination thereof. In a further example, storage device 134 may include a combination of one or more registers, one or more memory devices, one or more mass storage devices, other data storage devices, or a combination thereof, which may be arranged in a cache hierarchy.

Storage blocks 136A-Z may be any physical data storage or logical data storage for storing, organizing, or accessing data within storage device 134. A storage block may include a contiguous or non-contiguous sequence of physical bits or bytes. A storage block may have a block size which may be the same or different from a physical block size of the underlying hardware. The block size may be a fixed-size, such as a particular integer value (e.g., 4 KB) or may be a variable-size that varies within a range of integer values. Each of the storage blocks 136A-Z may have the same block size or may have different block sizes. In one example, storage blocks 136A-Z may be memory blocks and each of the memory blocks may correspond to a memory page, multiple memory pages, or a portion of a memory page. In another example, each of the storage blocks 136A-Z may correspond to a portion (e.g., sector) of a mass storage device (e.g., hard disk) or other storage device. In yet another example, each of the storage blocks 136A-Z may correspond to one or more hardware registers of a processing device.

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

The technology discussed herein may be used to provide multiple different enhancements to computing device 100. In one example, the technology may be used to defragment storage device 134 (e.g., encrypted main memory). The defragmentation process may involve detecting, by hypervisor 120, that a first encrypted storage block (e.g., 136B) is related to another one of the encrypted storage blocks (e.g., 136Z). The hypervisor may also determine that a second storage block (e.g., 136Y) is closer to the related storage block and initiate the copying of content from the first encrypted storage block to the second storage block to arrange or organize the multiple encrypted storage blocks in a more continuous manner.

The technology discussed above also or alternatively be used to move storage blocks between different levels of a cache hierarchy. In one example, the technology may be used to move an encrypted storage block of a virtual machine from a primary storage device 134 (e.g., main memory) to a secondary data storage device (e.g., hard drive, solid state storage, extended memory) or from the secondary data storage device to the primary storage device 134. In another example, the technology may be used to move an encrypted storage block from a first portion of a host's main memory that is associated with the virtual machine to an auxiliary portion of the hosts main memory that is not associated/assigned to the virtual machine. The auxiliary portion may function as a temporary buffer for swapping in or out data of the hypervisor and/or of one or more virtual machines.

Figure 2:
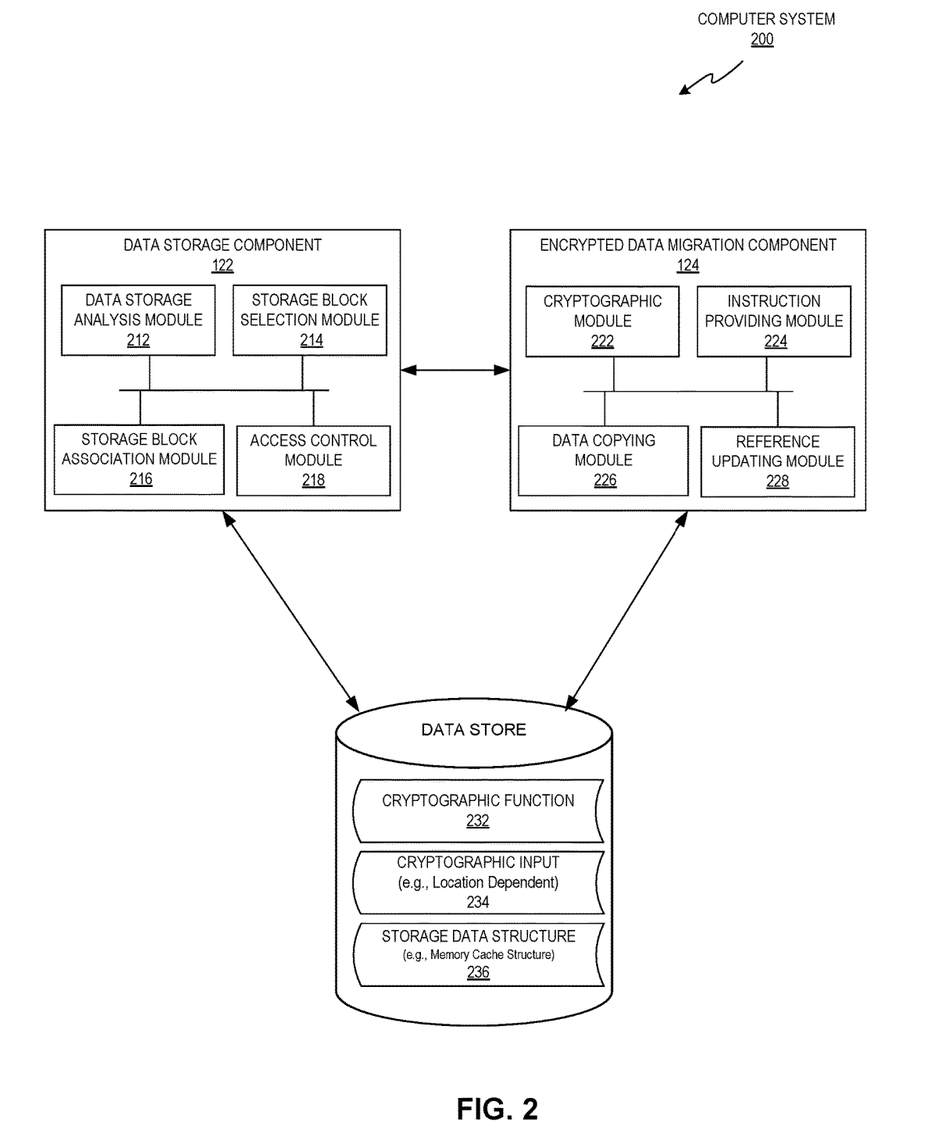
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. In the example shown, computer system 200 may include a data storage component 122 and an encrypted data migration component 124.

Data storage component 122 may enable computer system 200 to analyze one or more storage devices to identify portions of the storage device that may be re-organized (e.g., rearranged) to enhance the performance of computer system 200. As illustrated, data storage component 122 may include a data storage analysis module 212, a storage block selection module 214, storage block association module 216, and an access control module 218.

Data storage analysis module 212 may analyze data associated with one or more storage blocks to identify storage blocks that may be related to one or more other storage blocks. The data associated with the storage blocks may be any data that relates to a particular storage block or group of storage blocks and may include temporal data, spatial data, contextual data, other data, or a combination thereof. The temporal data associated with a storage block may be any data related to a time or frequency of access, modification, creation, deletion, or other operation that affects the one or more storage blocks. The spatial data may be any data that relates to the location of one or more storage blocks with respect to the storage device. The locations may be a particular location (e.g., address) or a relative location (e.g., adjacent to) and may include logical locations (e.g., virtual address or address range) or physical locations (e.g., physical address or address range) of the storage block. The contextual data may be any data that provides a context of a particular storage block or content within the particular storage block and may indicate a thread, process, user, host, virtual machine, or a combination thereof that is associated with the particular storage block. In one example, the temporal data, spatial data, or contextual data associated with the storage blocks may be analyzed and or weighted to calculate a relationship score. The relationship score may be a probabilistic value that indicates the probability that separate storage blocks or groups of storage blocks are related or associated with one another. The probabilistic value may be represented in any form such as decimals, fractions, percentages, ratios, other forms, or combination thereof.

Storage block selection module 214 may access data gathered or generated by data storage analysis module 212 and use it to detect a storage block that may be moved to enhance an overall performance of the computer system 200. Storage block selection module 214 may access the analytical data (e.g., temporal, spatial, and/or contextual data) associated with one or more storage blocks and may select a storage block that may be moved to enhance the computer systems use of the storage device. In one example, storage block selection module 214 may select one or more storage blocks that exceed (e.g., above or below) a predetermined threshold. Storage block selection module 214 may identify particular storage blocks or groups of storage blocks.

Storage block association module 216 may enable computer system 200 to associate or disassociate storage blocks with one or more particular virtual machines. A virtual machine may be associated with one or more storage blocks when the virtual machine is created (e.g., constructed), launched (e.g., initiated), during execution, or a combination thereof. During the virtual machine's operation, the storage block association component 218 may associate one or more storage blocks with the virtual machine that were not previously associated with the virtual machine. In one example, the storage block association component 216 may update the virtual machines configuration to increase the storage capacity of a virtual machine by adding one or more storage blocks. The increase in storage capacity may be temporary and exist during the migration of the storage block and may return to the original capacity after the migration has completed. In another example, the storage block association component 218 may update the virtual machines configuration to alter the storage capacity of the virtual machine without expanding the storage capacity. For example, it may disassociate one or more storage blocks at a first location that were previously associated with the virtual machine and then associate one or more new storage blocks at a second location that were not previously associated with the virtual machine. This may result in the storage capacity of the virtual machine remaining constant.

Associating a storage block with the virtual machine may provide the virtual machine with access to a storage block that was not previously accessible to the virtual machine. The association of the storage block may involve mapping, linking, mounting, installing, other action, or a combination thereof. The association of the storage block with the virtual machine may be initiated or performed by executable code that supports or hosts the virtual machine. The executable code may be included within the hypervisor, host operating system, hardware firmware, other executable code or a combination thereof and may involve updating or configuring the virtual machine (e.g., guest operating system, VM firmware), hypervisor, host operating system, storage device, or a combination thereof. In one example, the storage block may be a portion of a memory storage system (e.g., memory page) and associating the portion of memory may involve executing a memory mapping instruction (e.g., mmap system call). In another example, the storage block may a portion of another storage system such as a file system, data base system, other storage system, or a combination thereof.

Access control module 218 may control access to the storage blocks before, during, or after the migration in order to avoid data being lost during the migration. As discussed above, the storage blocks may be assigned or associated with a virtual machine that accesses and modifies the storage blocks. The virtual machine may be associated with one or more computing processes and one or more virtual processing devices (e.g., virtual central processing unit (vCPU)). Prior to migrating content of a storage block, access control module 218 may restrict a portion of the virtual machine from accessing the storage block. In one example, this may involve restricting one or more of the virtual processing devices of the virtual machine. For example, when the virtual machines includes a set of multiple virtual central processing units the access control module 218 may disable one or more of the plurality of virtual central processing units and may leave only a subset of the virtual processing devices (e.g., only a single vCPU) to perform the copying step discussed below. In another example, restricting a portion of the virtual machine may involve restricting one or more computing processes of the virtual machine. For example, when there are multiple computing processes the access control module 218 may disable (e.g., pause, terminate) one or more of the plurality of computing processing units and may leave only a subset (e.g., only a single computing process) to perform the copying step discussed below. In yet another example, access control module 218 may prohibit all forms of access by virtual machine or may enable read access but may restrict write access. In the latter case, the write requests (e.g., subsequent modifications) may be stored in one or more data structures (e.g., queues). The stored write requests may then be applied at any point before, during, or after encrypted data migration component 124 has begun or completed the migration.

Encrypted data migration component 124 may perform a migration of one or more storage blocks identified by data storage component 122 without having to access the data in an unencrypted form. In the example shown in FIG. 2, encrypted data migration component 124 may include a cryptographic module 222, an instruction providing module 224, a data copying module 226, and a reference updating module 228.

Cryptographic module 222 may interact with one or more underlying hardware devices of computer system 200 to initiate one or more transformations on the content of the identified storage block. A first transformation may involve decrypting the encrypted content of the storage block using a first cryptographic input (e.g., location dependent key) and a second transformation may involve encrypting (e.g., re-encrypting) the content of the storage block at a new location using a second cryptographic input (e.g., location dependent key of new location). The decrypted contents may remain hidden (e.g., concealed, kept secret) from the computing process (e.g., hypervisor) that has initiated the migration. The transformations initiated by the cryptographic module 222 may cause the underlying hardware devices (e.g., cryptographic features of a processor) to access cryptographic function 232 and cryptographic input 234 (e.g., cryptographic keys) to transform the content of the storage block being migrated. In one example, the cryptographic function 232 and cryptographic keys (e.g., location dependent or location independent keys) are stored and accessed by the underlying hardware devices but are concealed from both the hypervisor, virtual machine and any other higher-level executable code (e.g., executable code other than hardware based firmware).

Cryptographic module 222 may initiate cryptographic features of the computer system 200. In one example, the underlying hardware may execute a cryptographic function 232 using a combination of hardware features and lower-level executable code (e.g., firmware) without providing a higher-level executable code (e.g., kernel of hypervisor or host operating system) access to the cryptographic function 232, cryptographic input 234, unencrypted content, or a combination thereof. In another example, the cryptographic function may be executed by a portion of a kernel of a hypervisor or host operating system in combination with hardware and firmware features. The kernel may execute the cryptographic function 232 without providing higher-level executable code (e.g., guest operating system or container) access to the cryptographic function, cryptographic input, unencrypted content, or a combination thereof. In either scenario, the higher-level code may initiate and manage the migration and may not be capable of unencrypting the storage blocks because it may be exclusively performed by lower-level executable code and/or hardware. This may be advantageous because it may enhance security by reducing access to the cryptographic keys and the unencrypted data.

Cryptographic function 232 may be any function that is suitable for use in a standardized or proprietary cryptographic protocol and may involve one or more mathematical manipulations of content data. Cryptographic function 232 may map data of an arbitrary size to a bit sequence of a fixed size or variable size. In one example, cryptographic function 232 may be a cryptographic hash function that takes a content message as an input parameter and outputs a hash value, which may be referred to as cipher text, a digest, or a message digest. Cryptographic function 232 may include a private key cryptographic function a public key cryptographic function, other cryptographic function, or a combination thereof. In one example, cryptographic function 232 may be an "in-place" cryptographic function or include similar functionality that avoids copying the first storage block to another location during the execution of the cryptographic function (e.g., during encryption or during decryption).

An in-place cryptographic function may transform data within a storage block without using auxiliary data storage in the storage device. This may involve the content of the storage block being overwritten by the output of the cryptographic function while the cryptographic function executes. In one example, the in-place cryptographic function may use only the storage space of a single storage block and may update data within the storage block by swapping or replacing portions of data (e.g., any number of bits, bytes, nibbles, words). In another example, the in-place cryptographic function may use a small amount of auxiliary data within the storage block or elsewhere for indices or pointers (e.g., counter pointers). The small amount of auxiliary storage space may be proportionate to the size of the unencrypted content and in one example may be $O(\log n)$, $O(n)$, or other portion of "n", wherein "n" is the size (e.g., number of bits or bytes) of the unencrypted content data.

Cryptographic input 234 may include any data that is used to generate a cryptographic key or is used by cryptographic function 232 to encrypt or decrypt content data. Cryptographic input 234 may be any cryptographic bit sequence including encryption keys, decryption keys, public keys, private keys, symmetric keys, asymmetric keys, other cryptographic data, or a combination thereof. Cryptographic input 234 may include or be generated or derived from one or more initialization vectors, starting variables, other data, or a combination thereof. Cryptographic input 234 may include or be based on the spatial data, temporal data, or contextual data discussed above.

In one example, cryptographic input 234 may be a cryptographic bit sequence that is associated with or based on a location of a storage block. The location of the storage block may be based on hardware embedded information of a processing device, a storage device, a machine (physical or virtual machine), or other information associated with a storage block. In one example, cryptographic input 234 may be based on location information (e.g., spatial data) that corresponds to the storage block. The location information may be relative to a particular storage device, such as a physical address, a logical address, other address, or a combination thereof. In other examples, cryptographic input 234 may also or alternatively be based on other location information such as information of the storage device containing the storage block or information about a processing device, interface, port, adapter, or other device for accessing the storage block. The location information may be based on data that is permanently or temporarily associated with (e.g., embedded within) a hardware device. In one example, this may cause each particular storage block to be associated with different cryptographic input 234 that is based on the location of the particular storage block. This may be advantageous because it may provide enhanced security protection but may cause content encrypted with a location based input to become inaccessible when moved to a different storage block.

In another example, cryptographic input 234 may be location independent and not tied to a location of a particular storage block. Cryptographic input 234 may function the same or similar to a transport key or migration key that enables the storage block to be transported between storage block locations in an encrypted form without becoming inaccessible. Cryptographic input 234 may be used to encrypt content of one or more storage blocks and then used to decrypt the content after it is moved to other locations. In one example, the cryptographic input 234 may be a cryptographic key or a pair of cryptographic keys that can be used to perform the encryption and subsequent decryption. In another example, the cryptographic input 234 may be used to generate (e.g., mathematically derive) one or more encryption keys and one or more decryption keys. Cryptographic input 234 may be based on information provided by the computing process that is initiating the encryption or decryption (e.g., hypervisor process). The information provided may be generated by the computing process initiating the transformation or by another computing process. The information provided may be randomly generated for temporary use during the migration. The duration of the temporary use may be based on a duration of a particular migration, a duration of the computing process, other duration, or a combination thereof.

Instruction providing module 224 may enable a hypervisor or host operating system to instruct a virtual machine to perform an action. In traditional virtualization architectures, a virtual machine provides instructions to the hypervisor to initiate operations (e.g., hypercalls), but instruction providing module 224 may provide a complimentary service that enables a hypervisor to provide instructions to the virtual machine to cause the virtual machine to perform an operation. This may enable the operation to occur with the privileges and access available to the virtual machine as opposed to privileges and access of the hypervisor. This may be advantageous because the virtual machine may have access to the content of encrypted storage blocks that may be unavailable to the hypervisor.

Instruction providing module 224 may provide the instructions to the virtual machine using a variety of different mechanisms. The mechanisms may involve the use of a hardware generated messages (e.g., hardware signals) in the form of interrupts, traps, notifications, exceptions, faults, other signals, or a combination thereof. The hardware message may be initiated by the hypervisor and cause the virtual machine to perform an action, such as copying, moving, or migrating a storage block from a first location to a second location. In one example, instruction providing module 224 may inject an interrupt into a virtual processor of the virtual machine that initiates a copy operation. The interrupt may be a non-maskable interrupt (NMI) which may be a notification or alert that appears to be issued by the virtual processor executing the virtual machine and may indicate an event needs attention. The interrupt may be received by an interrupt handler of the virtual machine and the interrupt handler may cause the virtual machine to perform the action. In another example, instruction providing module 224 may inject an exception into the virtual processor or initiate an exception that is received by an exception handler of the virtual machine and may cause the virtual machine to perform the action. In either example, the executable code necessary to perform the operation may exist within the virtual machine or may be embedded within a portion of the virtual machine before, during, or after the message (e.g., interrupt or exception) is generated.

Data copying module 226 may interact with instruction providing module 224 to cause the virtual machine to copy a storage block from an original physical location to a new physical location. Copying the storage block may involve copying the content of the entire storage block or just a portion of the storage block. The copying may be performed without exposing the content in an unencrypted form to the hypervisor or host operating system. In one example, the content may be copied while it is in an encrypted form (e.g., location independent encryption). In another example, the content may be copied while the content is in an unencrypted form but it may be performed at the hardware level so that the content remains hidden (e.g., concealed, unexposed, secret, inaccessible, unavailable) from the hypervisor and/or host operating system. During the copy, the content may be exposed to the virtual machine in an encrypted or unencrypted form or it may be hidden from virtual machine when it is performed at a hardware level.

The original physical location and the new physical location may be on the same or different data storage devices. In one example, each of the storage blocks may comprise encrypted memory pages stored in the same memory device and the original location and the new location may each comprise a physical memory address of the same memory device. In another example, the storage blocks may comprise encrypted memory pages stored across multiple memory devices and the original location may be in a first memory device and the new location may be in a second memory device. The first and second memory devices may be memory devices that were or were not manufactured separately and may be associated with the same or different caching levels (e.g., main memory) of a cache hierarchy.

Copying a storage block may involve copying the content of the storage block to a new location and may involve a copy operation, a move operation, a migrate operation, a removal operation (e.g., delete, deallocate, free), other operation, or a combination thereof. In one example, the copy may involve physically manipulating the bits at the original location and/or at the new location. In another example, the copying may involve an operation that manipulates one or more pointers without physically manipulating the bits of the storage block at the original or new locations. In yet another example, the copying or subsequent steps of the migration may involve a combination of manipulating physical bits and references to the physical bits. The references (e.g., pointers) may be stored in storage data structure 236.

Storage data structure 236 may include references corresponding to the one or more storage blocks. Each reference may identify (e.g., point to) the beginning, middle, end, or other portion of the one or more storage blocks. Storage data structure 236 may be a memory cache data structure or other storage data structure that corresponds to a caching system, a file system, a database system, other storage system, or a combination thereof. In one example, storage data structure 236 may be an address-translation cache (e.g., Translation Lookaside Buffer (TLB)) that translates between virtual and physical memory locations (e.g., memory addresses). The memory cache data structure may include one or more pointer entries (e.g., Page Table Entries (PTE)) that point to respective storage blocks (e.g., memory pages). After identifying a storage block to be moved, the access control module 218 may update the memory cache data structure by invalidating the pointer entries for one or more of the storage blocks and may flush the address-translation cache from one or more processing devices (e.g., virtual processors or physical processors) to remove references to the storage block.

Reference updating module 228 may update storage data structure 236 to update a reference that points to the original storage block to subsequently point to the new storage block. This may be advantageous because updating the reference to the new storage block may enable the underlying physical bits to be moved while minimizing the changes that affect higher level executable code that accesses the moved content. Updating the reference may also effectively remove the references (i.e., dereference) the original storage block so that it can be subsequently reused, reallocated, flushed, wiped, or other action.

When the storage blocks are portions of memory (e.g., memory pages) the reference updating module 225 may update multiple separate storage data structures corresponding to the virtual machine, hypervisor, or host operating system. For example, there may be a first storage data structure that corresponds to the host memory and may be maintained by the hypervisor and there may be a second storage data structure that corresponds to guest memory of the virtual machine and may be maintained by the virtual machine. The host memory may correspond to physical memory (e.g., main memory) of the host and the guest memory may correspond to what appears to the virtual machine as its portion of physical memory (e.g., guest physical memory).

During the migration of a storage block, one or more of the storage data structures may be updated. The original storage block and the new storage block may each have a reference in the guest storage data structure and a reference in the host storage data structure. For example, the original storage block may correspond to a guest source address and a host source address and the new storage block may correspond to a guest destination address and a host destination address. The copy operation may be provided the guest source address and the guest destination address but before, during, or after the virtual machine completes the copy, the reference updating module 228 may update the guest source address to point to the host destination address. This may enable higher level computing processes that are associated with memory at the guest source address to continue operating without being aware that the corresponding physical bits have been moved to a different physical location.

After the reference updating module 228 has updated the relevant storage data structures, it may re-enable the virtual processing devices that were previously disabled. Reference updating module 228 may also cause any cached versions of the storage data structures to be refreshed so that they include references to the new location. This may conclude the migration of the encrypted content of the storage blocks.

Figure 3:
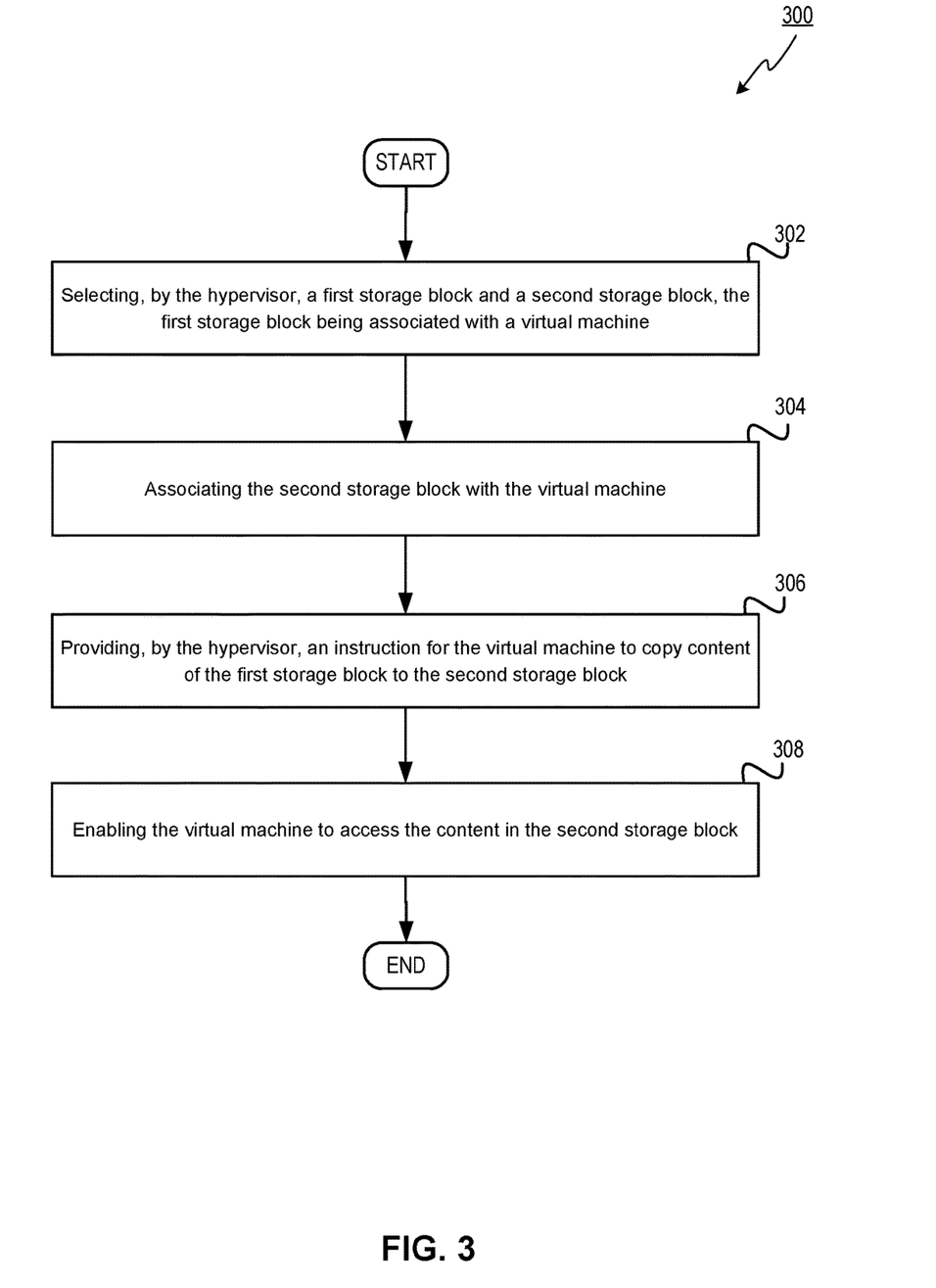
FIG. 3 depicts a flow diagram of an example method for migrating storage blocks with encrypted data in a security enhanced manner, in accordance with one or more aspects of the present disclosure.

FIG. 3 depicts a flow diagram of an illustrative example of a method 300 for migrating encrypted data in a security enhanced manner, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 300 may be performed by processing devices of a server device or a client device and may begin at block 302. At block 302, the processing device executing the hypervisor may select a first storage block and a second storage block and the first storage block may be associated with a virtual machine. The processing device may select the first storage block from a plurality of storage blocks with encrypted content. The plurality of storage blocks may each be encrypted using a cryptographic key that corresponds to a hardware feature of the respective storage block and the hardware feature may be based on a physical address of the respective storage block. The first storage block may be associated with a particular virtual machine that has exclusive use or non-exclusive use (e.g., shared use) of the first storage block.

The content of the first and second storage blocks may be accessible to the virtual machine in an unencrypted form without being accessible to the hypervisor in an unencrypted form. For example, the plurality of encrypted storage blocks may be assigned to a virtual machine and decrypted content of the plurality of storage blocks may remain inaccessible to a hypervisor hosting the virtual machine before, during, and after a migration. In one example, the first storage block and the second storage block may be memory pages within a main memory of a host machine that is executing the hypervisor and the virtual machine.

At block 304, the processing device may associate the second storage block with the virtual machine. The second storage block may be inaccessible by the virtual machine prior to the hypervisor associating the second storage block with the virtual machine. In one example, associating the second storage block with the virtual machine may involve the hypervisor mapping the second storage block of the host machine into a guest memory of the virtual machine.

At block 306, the processing device executing the hypervisor may provide an instruction for the virtual machine to copy content of the first storage block to the second storage block. The content of the first storage block may be encrypted using a location dependent cryptographic input that is based on a physical address of the first storage block. The location dependent cryptographic input may be available to a hardware device executing a cryptographic function but may be concealed from the hypervisor and the virtual machine. In one example, providing the instruction for the virtual machine to copy content involves the hypervisor injecting a message into a virtual processor of the virtual machine to cause the virtual machine to perform the copy. The message may include an interrupt, an exception, other hardware message, or a combination thereof.

At block 308, the processing device may enable the virtual machine to access the content in the second storage block. Enabling the virtual machine to access the content in the second storage block may involve updating a reference of the virtual machine that points to the first storage block to point to the second storage block. This may dereference the first storage block and the processing device may disassociate the first storage block from the virtual machine after the virtual machine finishes copying the content of the first storage block to the second storage block. Responsive to completing the operations described herein above with references to block 308, the method may terminate.

In other examples of method 300, the processing device executing the hypervisor may restrict the virtual machine from accessing the content prior to the copy and then provide (e.g., re-enable) the portion of the virtual machine with access the content after the copy. When the virtual machine comprises a plurality of virtual central processing units, the portion may be subset of the virtual central processing units (e.g., all but one vCPU) and restricting the portion of the virtual machine may involve disabling the virtual central processing units in the subset. Before, during, or after the copy is completed, the processing device may invalidate a page table entry corresponding to the storage blocks and flush a translation cache (e.g., translation lookaside buffer) on multiple processors (e.g., vCPUs) that contain references to at least one of the plurality of encrypted storage blocks. This will cause the re-enabled processors to include the updated reference that points to the second storage block instead of the first storage block.

Figure 4:
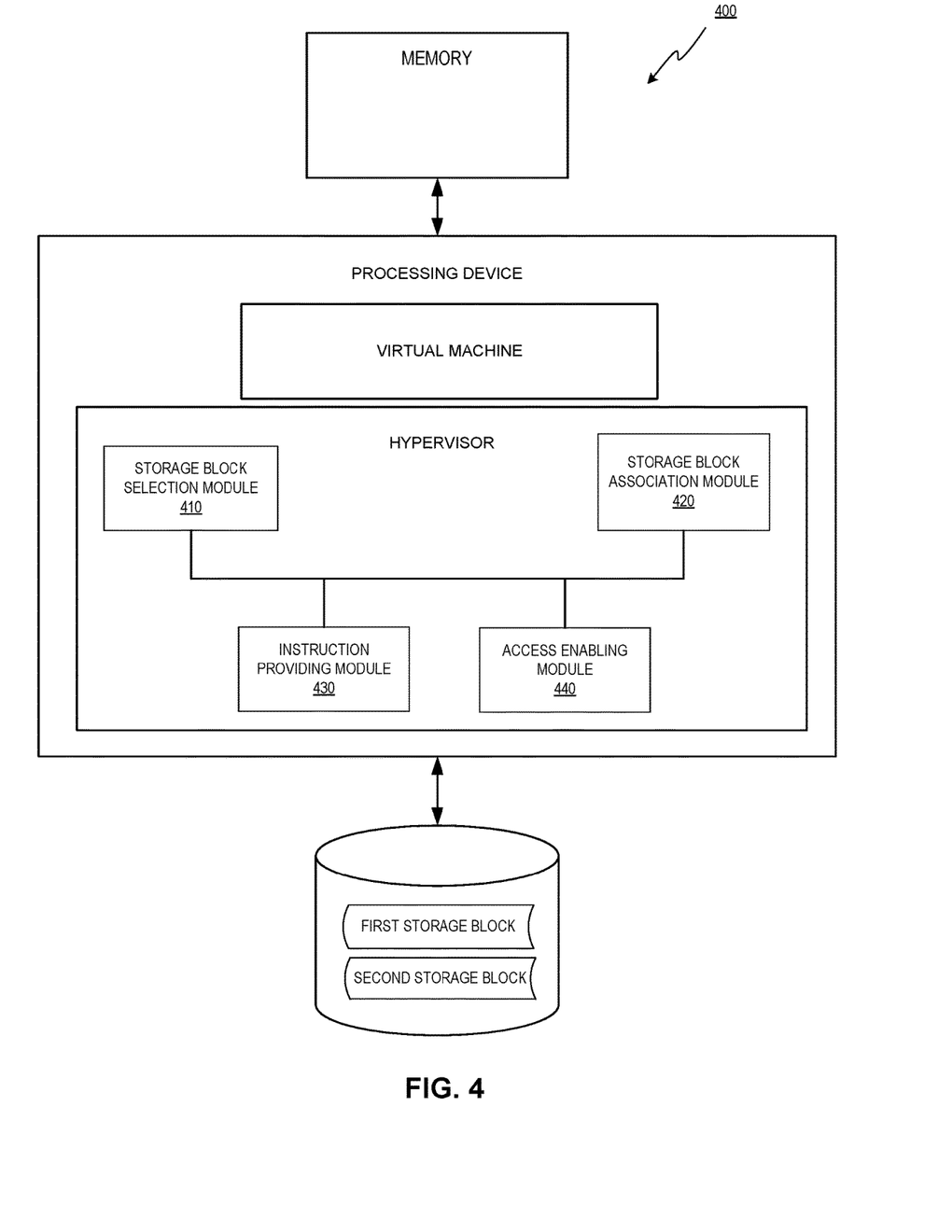
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 200 and computing device 100 and may include one or more processing devices and one or more memory devices. In the example shown, computer system 400 may include a storage block selection module 410, a storage block associating module 420, an instruction providing module 430, and an access enabling module 440.

Storage block selection module 410 may enable the processing device to select a first storage block and a second storage block, wherein the first storage block is associated with a virtual machine. The processing device may select the first storage block from a plurality of storage blocks with encrypted content. The plurality of storage blocks may each be encrypted using a cryptographic key that corresponds to a hardware feature of the respective storage block and the hardware feature may be based on a physical address of the respective storage block. The first storage block may be associated with a particular virtual machine that has exclusive use or non-exclusive use (e.g., shared use) of the first storage block.

The content of the first and second storage blocks may be accessible to the virtual machine in an unencrypted form without being accessible to the hypervisor in an unencrypted form. For example, the plurality of encrypted storage blocks may be assigned to a virtual machine and decrypted content of the plurality of storage blocks may remain inaccessible to a hypervisor hosting the virtual machine before, during, and after a migration. In one example, the first storage block and the second storage block may be memory pages within a main memory of a host machine that is executing the hypervisor and the virtual machine.

Storage block associating module 420 may enable the processing device to associate the second storage block with the virtual machine. The second storage block may be inaccessible by the virtual machine prior to the hypervisor associating the second storage block with the virtual machine. In one example, associating the second storage block with the virtual machine may involve the hypervisor mapping the second storage block of the host machine into a guest memory of the virtual machine.

Instruction providing module 430 may enable the processing device to provide an instruction for the virtual machine to copy content of the first storage block to the second storage block. The content of the first storage block may be encrypted using a location dependent cryptographic input that is based on a physical address of the first storage block. The location dependent cryptographic input may be available to a hardware device executing a cryptographic function but may be concealed from the hypervisor and the virtual machine. In one example, providing the instruction for the virtual machine to copy content involves the hypervisor injecting a message into a virtual processor of the virtual machine to cause the virtual machine to perform the copy. The message may include an interrupt, an exception, other hardware message, or a combination thereof.

Access enabling module 440 may enable the processing device to enable the virtual machine to access the content in the second storage block. Enabling the virtual machine to access the content in the second storage block may involve updating a reference of the virtual machine that points to the first storage block to point to the second storage block. This may dereference the first storage block and the processing device may disassociate the first storage block from the virtual machine after the virtual machine finishes copying the content of the first storage block to the second storage block.

Figure 5:
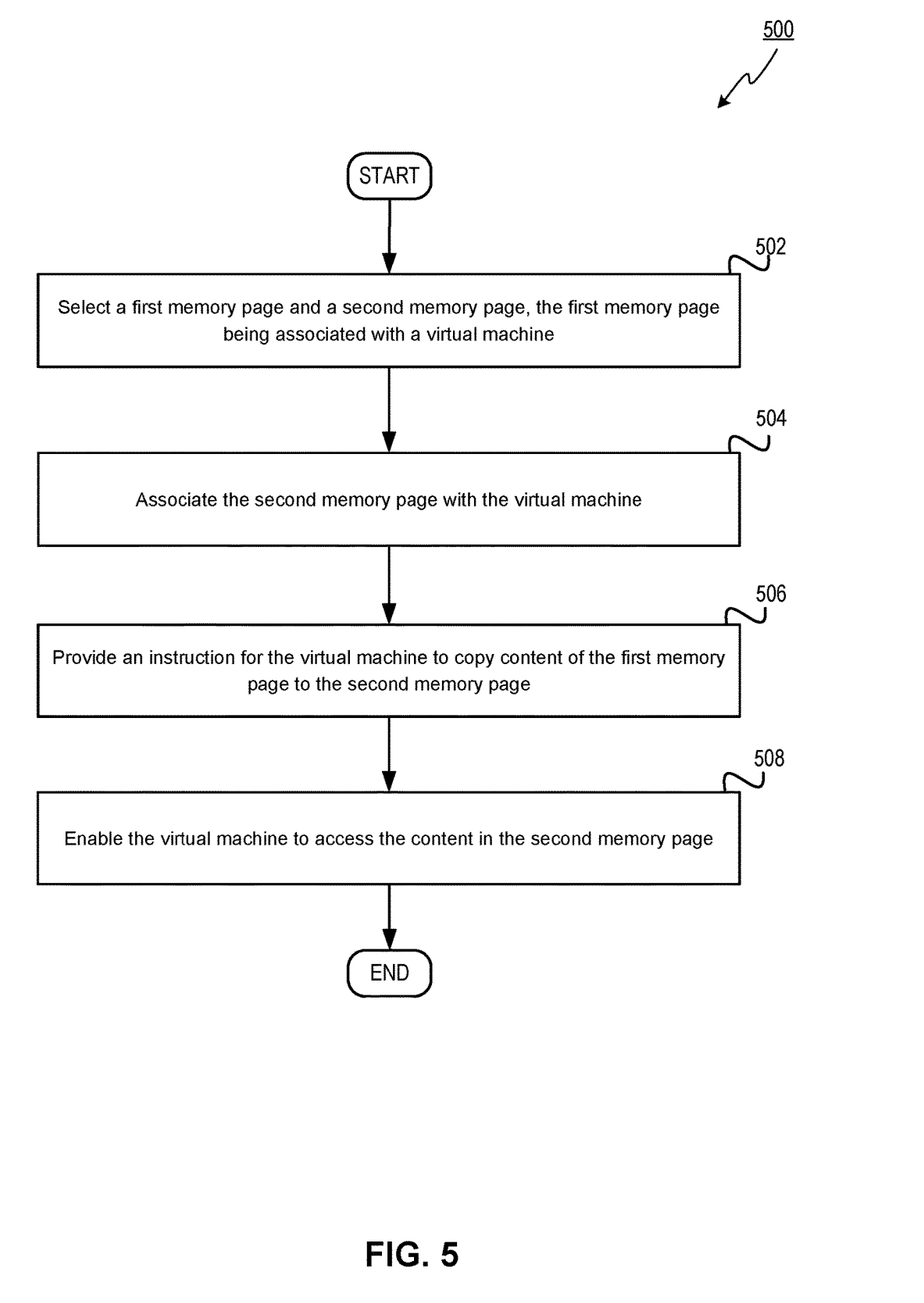
FIG. 5 depicts a flow diagram of an example method for migrating memory pages with encrypted data in a security enhanced manner, in accordance with one or more aspects of the present disclosure.

FIG. 5 depicts a flow diagram of one illustrative example of a method 500 for migrating encrypted data in a security enhanced manner, in accordance with one or more aspects of the present disclosure. Method 500 may be similar to method 300 and may be performed in the same or a similar manner as described above in regards to method 300. Method 500 may be performed by processing devices of a server device or a client device and may begin at block 502.

At block 502, the processing device may select a first memory page and a second memory page and the first memory page may be associated with a virtual machine. The processing device may select the first memory page from a plurality of memory pages with encrypted content. The plurality of memory pages may each be encrypted using a cryptographic key that corresponds to a hardware feature of the respective memory page and the hardware feature may be based on the actual physical address of the respective memory page. The first memory page may be associated with a particular virtual machine that has exclusive use or non-exclusive use (e.g., shared use) of the first memory page.

The content of the first and second memory pages may be accessible to the virtual machine in an unencrypted form without being accessible to the hypervisor in an unencrypted form. For example, the plurality of encrypted memory pages may be assigned to a virtual machine and decrypted content of the plurality of memory pages may remain inaccessible to a hypervisor hosting the virtual machine before, during, and after a migration. In one example, the first memory page and the second memory page may be memory pages within a main memory of a host machine that is executing the hypervisor and the virtual machine.

At block 504, the processing device may associate the second memory page with the virtual machine. The second memory page may be inaccessible by the virtual machine prior to the hypervisor associating the second memory page with the virtual machine. In one example, associating the second memory page with the virtual machine may involve the hypervisor mapping the second memory page of the host machine into a guest memory of the virtual machine.

At block 506, the processing device may provide an instruction for the virtual machine to copy content of the first memory page to the second memory page. The content of the first memory page may be encrypted using a location dependent cryptographic input that is based on a physical address of the first memory page. The location dependent cryptographic input may be available to a hardware device executing a cryptographic function but may be concealed from the hypervisor and the virtual machine. In one example, providing the instruction for the virtual machine to copy content involves the hypervisor injecting a message into a virtual processor of the virtual machine to cause the virtual machine to perform the copy. The message may include an interrupt, an exception, other hardware message, or a combination thereof.

Figure 6:
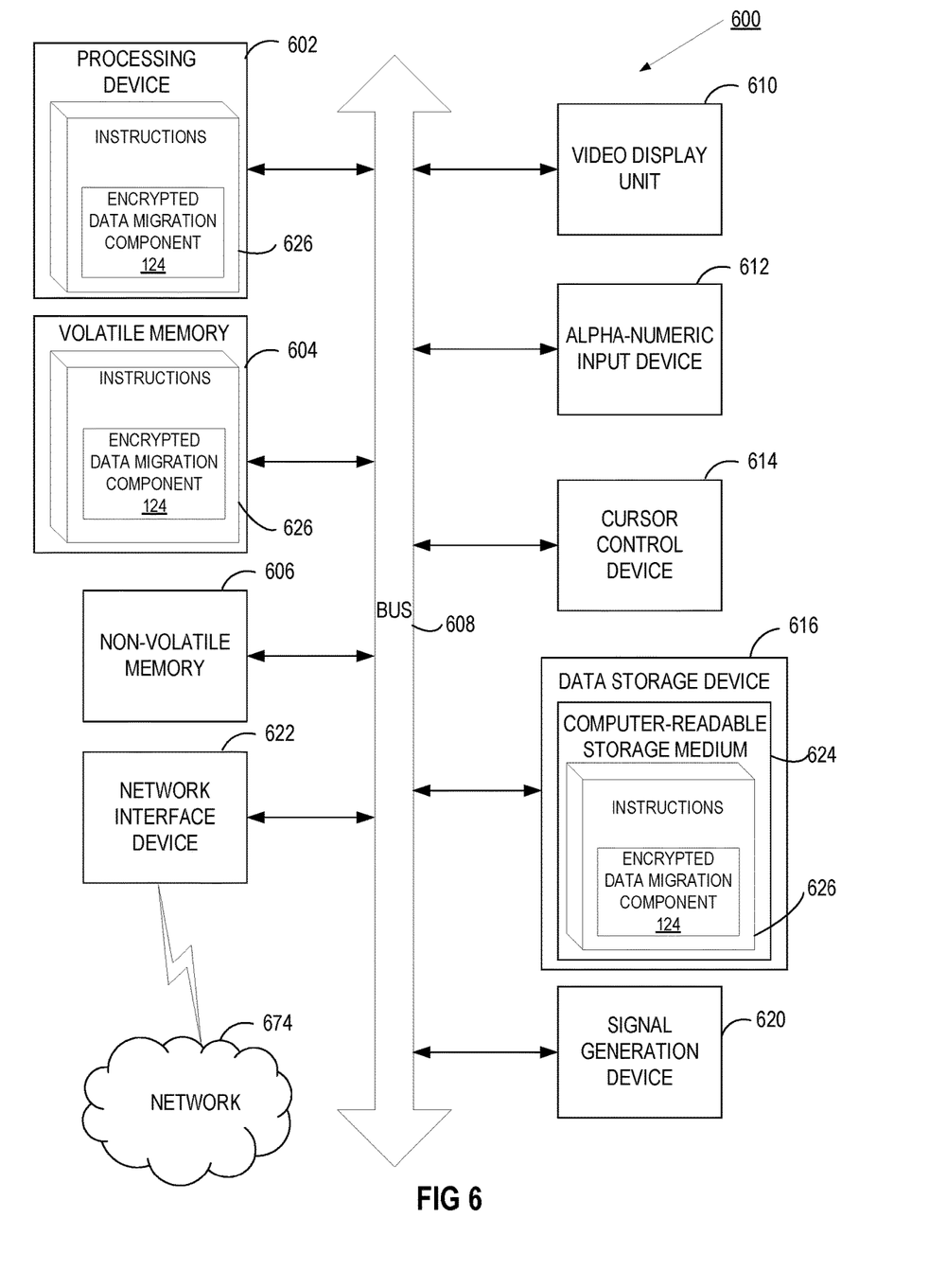
FIG. 6 depicts a block diagram of an illustrative computing device operating in accordance with the examples of the present disclosure.

At block 508, the processing device may enable the virtual machine to access the content in the second memory page. Enabling the virtual machine to access the content in the second memory page may involve updating a reference of the virtual machine that points to the first memory page to point to the second memory page. This may dereference the first memory page and the processing device may disassociate the first memory page from the virtual machine after the virtual machine finishes copying the content of the first memory page to the second memory page. Responsive to completing the operations described herein above with references to block 508, the method may terminate FIG. 6 depicts a block diagram of a computer system operating in accordance with one or more aspects of the present disclosure. In various illustrative examples, computer system 600 may correspond to computing device 100 of FIG. 1 or computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for encoding encrypted data migration component 124 and modules illustrated in FIGS. 1 and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 or 500 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    selecting, by a processing device executing a hypervisor, a first storage block and a second storage block, the first storage block being associated with a virtual machine;
    associating the second storage block with the virtual machine;
    providing, by the hypervisor, an instruction for the virtual machine to copy content of the first storage block to the second storage block; and
    enabling the virtual machine to access the content in the second storage block.

2. The method of claim 1, wherein the content of the first storage block is encrypted using a location dependent cryptographic input, the location dependent cryptographic input being based on a physical address of the first storage block.

3. The method of claim 2, wherein the location dependent cryptographic input is available to a hardware device executing a cryptographic function and concealed from the hypervisor and the virtual machine.

4. The method of claim 1, wherein the content is accessible to the virtual machine in an unencrypted form without being accessible to the hypervisor in an unencrypted form.

5. The method of claim 1, wherein the first storage block and the second storage block are memory pages within a main memory of a host machine executing the hypervisor and the virtual machine.

6. The method of claim 1, wherein the second storage block is inaccessible by the virtual machine prior to the hypervisor associating the second storage block with the virtual machine.

7. The method of claim 1, wherein associating the second storage block with the virtual machine comprises the hypervisor mapping the second storage block of the host machine into a guest memory of the virtual machine.

8. The method of claim 1, further comprising disassociating the first storage block from the virtual machine in response to the virtual machine copying the content of the first storage block to the second storage block.

9. The method of claim 1, wherein providing the instruction for the virtual machine to copy content comprises the hypervisor injecting a message into a virtual processor of the virtual machine to cause the virtual machine to perform the copy, wherein the message comprises an interrupt or an exception.

10. The method of claim 1, further comprising:
restricting a portion of the virtual machine from accessing the content prior to the copy; and
providing the portion of the virtual machine with access to the content after the copy.

11. The method of claim 10, wherein the virtual machine comprises a plurality of virtual central processing units, and wherein restricting the portion of the virtual machine comprises disabling one or more of the plurality of virtual central processing units.

12. The method of claim 1, wherein enabling the virtual machine to access the content in the second storage block comprises updating a reference of the virtual machine that points to the first storage block to point to the second storage block.

13. A system comprising:
a memory;
a processing device operatively coupled to the memory, the processing device to:
select, by the hypervisor, a first storage block and a second storage block, the first storage block being associated with a virtual machine;
associate the second storage block with the virtual machine;
provide, by the hypervisor, an instruction for the virtual machine to copy content of the first storage block to the second storage block; and
enable the virtual machine to access the content in the second storage block.

14. The system of claim 13, wherein the content of the first storage block is encrypted using a location dependent cryptographic input, the location dependent cryptographic input being based on a physical address of the first storage block.

15. The system of claim 13, wherein the content is accessible to the virtual machine in unencrypted form without being accessible to the hypervisor in unencrypted form.

16. The system of claim 13, wherein the first storage block and the second storage block are memory pages within a main memory of a host machine that is executing the hypervisor and the virtual machine.

17. A non-transitory machine-readable storage medium storing instructions that cause a processing device to:
select a first memory page and a second memory page, the first memory page being associated with a virtual machine;
associate the second memory page with the virtual machine;
provide an instruction for the virtual machine to copy content of the first memory page to the second memory page; and
enable the virtual machine to access the content in the second memory page.

18. The non-transitory machine-readable storage medium of claim 17, wherein the content of the first storage block is encrypted using a location dependent cryptographic input, the location dependent cryptographic input being based on a physical address of the first storage block.

19. The non-transitory machine-readable storage medium of claim 17, wherein the content is accessible to the virtual machine in unencrypted form without being accessible to the hypervisor in unencrypted form.

20. The non-transitory machine-readable storage medium of claim 17, wherein the first storage block and the second storage block are memory pages within a main memory of a host machine that is executing the hypervisor and the virtual machine.

* * * * *